United States Patent [19]

Fidelman

[11] Patent Number: 5,279,319
[45] Date of Patent: Jan. 18, 1994

[54] WATER PRESSURE RELIEF METHOD AND SYSTEM FOR WATER HEATERS

[76] Inventor: George R. Fidelman, 109 Timber Lake Dr., Venetia, Pa. 15367

[21] Appl. No.: 765,270

[22] Filed: Sep. 25, 1991

[51] Int. Cl.⁵ ............................................. F16K 17/04
[52] U.S. Cl. .............................. 137/14; 68/207; 126/362; 137/115; 137/539; 137/560; 137/562; 137/798
[58] Field of Search .......... 68/207; 126/362; 137/14, 115, 539, 560, 562, 798

[56] References Cited

U.S. PATENT DOCUMENTS

| | | |
|---|---|---|
| 618,903 | 2/1899 | Prince . |
| 1,857,666 | 10/1927 | Smallhouse . |
| 1,902,231 | 7/1931 | Gurley . |
| 2,173,797 | 10/1935 | Magnuson . |
| 3,754,563 | 8/1973 | Boals . |
| 3,807,432 | 4/1974 | Cain .................. 137/539 X |
| 4,171,708 | 10/1979 | Pareja . |
| 4,231,386 | 11/1980 | Braukmann . |
| 4,273,151 | 6/1981 | Nezworski ........... 137/115 |
| 4,369,806 | 1/1983 | Noren .................. 137/216 |

*Primary Examiner*—Robert G. Nilson
*Attorney, Agent, or Firm*—Carothers & Carothers

[57] ABSTRACT

A system for alleviating leakage or weepage from a pressure relief valve found on conventional hot water heater tanks due to water pressure build-up in residential water lines caused by the application of intense heat with fast recovery type hot water heaters wherein a water pressure relief valve is easily and quickly connected between a washing machine water supply outlet faucet and a flexible washing machine water inlet hose and water vented from this pressure relief valve is vented through a flexible hose to an appropriate drain.

14 Claims, 1 Drawing Sheet

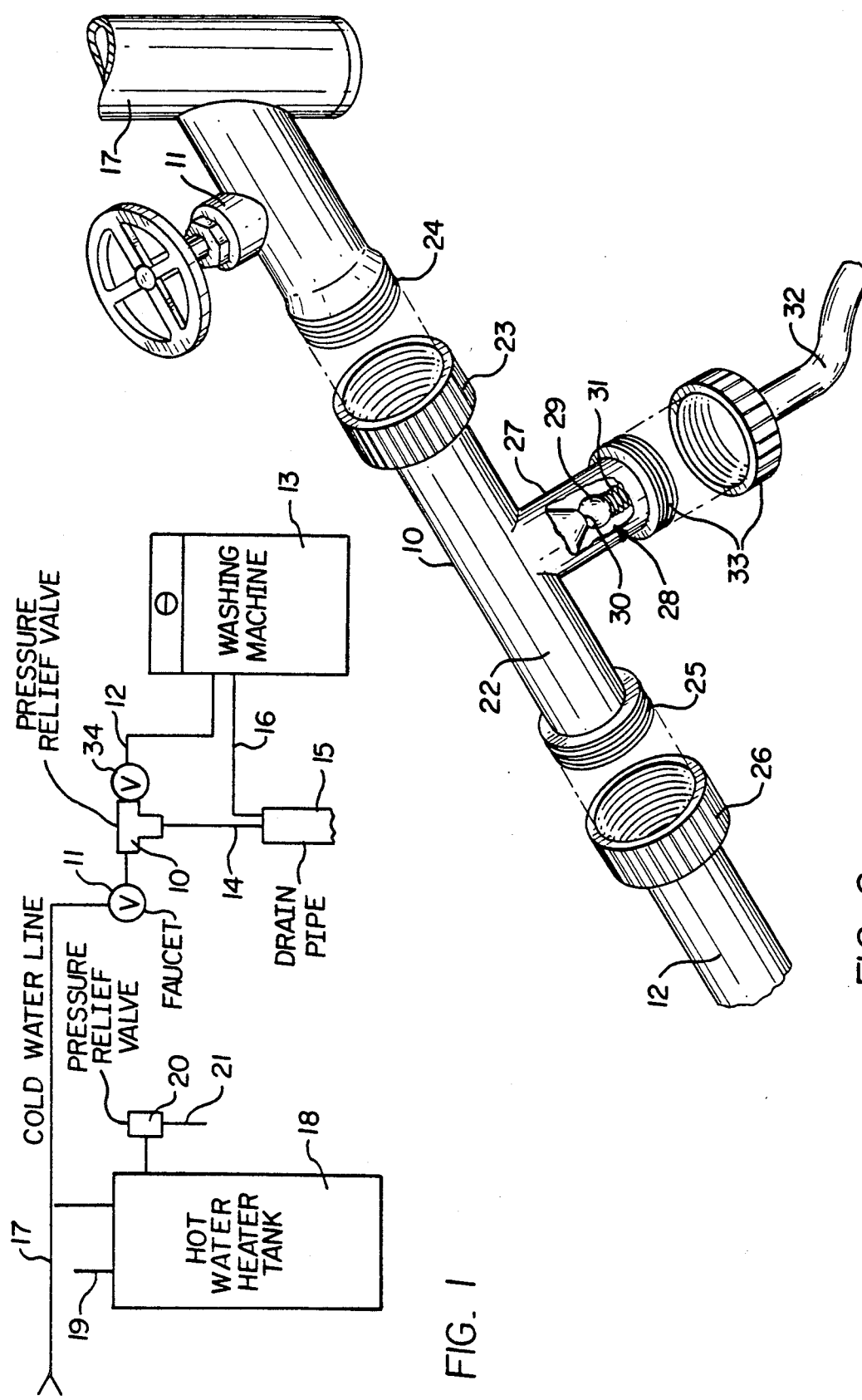

WATER PRESSURE RELIEF METHOD AND SYSTEM FOR WATER HEATERS

BACKGROUND OF THE INVENTION

The present invention relates generally to an improved apparatus and method for relieving excessive water pressure build-up in internal residential water lines, and more particularly to a method and apparatus for venting water under excessive pressure from such internal residential water lines to an appropriate drain, thereby preventing unwanted weepage of water from the pressure release valve found on conventional hot water heater tanks.

The newer residential hot water heaters of the fast or quick recovery type tank heaters which are generally gas fired, require intense application of heat to the tank in order to provide quick recovery of hot water within the tank. In applying this intense heat, the water pressure within the hot water tank can raise the water line pressure within the water line system of the residence to a point where the water tank relief valve vents and leaks water from the overflow, usually in an unwanted manner onto the floor.

The water pressure relief valve commonly found on most hot water tanks is set to vent water under pressure typically at a pressure of 120 p.s.i. Even though this pressure is relatively high, the intense application of heat to the hot water tank, nevertheless, can quickly create pressure within the tank that exceeds this limit causing the pressure relief valve on the hot water tank to leak, weep or vent water onto the floor thereby creating and unwanted mess.

This situation is created because water expands in volume as its temperature rises. For example, in a 40 gallon water heater, the water will expand to a volume of about 40.53 gallons when recovery is completed and this increase in pressure is retained in the residential water lines as water meters with check valves, and/or pressure reducing valves, prevent the expanded water from returning to the city supply.

This leakage of hot water onto the floor at the water heater pressure relief valve is not only wasteful but it can also be dangerous. In addition, this constant operation of the pressure relief valve at the water heater tank can readily cause the relief valve to become defective. These high internal pressures occurring repeatedly can also shorten the life of the water heater.

One device presently on the market for alleviating this problem is a device that consists of a water pressure relief valve that is adapted to be connected within the water storage tank of a water closet or toilet and this pressure relief valve is preset to exhaust water into the water closet tank when the water pressure in the cold water line exceeds a predetermined pressure, which is normally set to be from between 80 to 90 p.s.i. or less. Accordingly, the pressure is relieved in the residential water line system by venting some of the water off into the water closet tank at a pressure which is lower than the 120 p.s.i. pressure relief limit set for the pressure relief valve on the hot water heater tank thereby alleviating the high pressure problem at a pressure lower than that set at the hot water tank relief valve which prevents this relief valve at the hot water tank from weeping or leaking excess water onto the floor next to the tank.

The problem with this existing system is that the mechanism is relatively expensive as this special pressure relief valve must be adapted for a unique coupling or connection situation within the water closet storage tank. In addition, this device cannot be readily and easily connected by the homeowner who is generally unskilled in such plumbing techniques. Accordingly, the average home owner is required to retain a plumber to connect the device within the water closet tank which adds considerable expense to the installation.

It is a principal object of the present invention to provide a water pressure relief system and method which is inexpensive to manufacture and which is further very simple to install by even the most mechanically unskilled homeowner.

SUMMARY OF THE INVENTION

The present invention provides a method and apparatus for relieving pressure build-up in interior residential water lines wherein a water pressure relief valve is connected between a water supply outlet faucet for the washing machine and the flexible washing machine water inlet hose by simple connections such as the threadable connections normally used for connecting the flexible washing machine inlet hose to the faucet. This pressure relief valve can be installed very easily by even one with minimal mechanical skill.

The pressure relief valve is further provided with a drain hose to drain off any water under excessive pressure which is vented therefrom to an appropriate drain. This drain line from the water pressure relief valve is in the form of a flexible tube that can be directed into the stationary tub normally fund adjacent the washing machine or into a conventional drain pipe which many washing machines utilize.

This water pressure relief valve is normally set to vent water when it attains an internal pressure in the approximate range of 80 to 90 p.s.i. or less.

The water pressure relief valve of the present invention may of course be also connected to the hot water faucet for the washing machine instead of the cold water faucet and thereby accomplish the same results, however, it is preferable to vent cold water as opposed to venting hot water for obvious economic reasons.

It is further understandable that many homeowners desire to turn off the hot and cold water supply valves or faucets feeding the washing machine when they are away from home to prevent leakage in the flexible inlet hoses of the washing machine. In order to provide the homeowner with this continued capability, an additional water valve may be secured, again, with conventional threaded couplings by the homeowner between the pressure relief valve and the flexible inlet hose for the washing machine so that this newly installed valve may be turned off and yet still permit the excessive water pressure relief system continue to work.

BRIEF DESCRIPTION OF THE DRAWINGS

Other objects and advantages appear hereinafter in the following description and claims.

The accompanying drawings show, for the purpose of exemplification, without limited the invention or claims thereto, certain practical embodiments illustrating the principals of this invention wherein:

FIG. 1 is a diagramatic representation of a preferred embodiment illustrating the method and apparatus of the present invention for relieving pressure build-up in the interior lines of a residence created by the fast recovery of hot water heaters.

FIG. 2 is an enlarged and exploded view illustrating the details of the water pressure relief valve portion of the system illustrated in FIG. 1.

DESCRIPTION OF THE PREFERRED EMBODIMENT

Referring to FIG. 1, the water pressure relief system of the present invention is comprised generally of water pressure relief valve 10 which is coupled between the spout end of faucet 11 and the washing machine inlet hose 12 of washing machine 13. When water under excessive pressure is vented (usually within an approximate pressure range of 80 to 90 p.s.i) it is vented from relief valve 10 through drain hose or tube 14 which directs the water to an appropriate drain or drain pipe 15, which in this instance is also the drain for washing machine 13 which drains water thereto through outlet drain hose 16.

Faucet 11 is here illustrated as the cold water faucet and it is connected to the cold water supply line 17 of the residence, which is of course also connected to supply cold water to hot water heater tank 18, which is of the fast recovery gas fired type.

As previously mentioned, faucet 11 could alternatively be connected to hot water supply pipe 19 and the system of the present invention would still work effectively.

Since pressure relief valve 10 vents water under excessive pressure to drain 15 at a pressure which is less than that set for the pressure relief valve 20, the internal pressure of hot water heater tank 18 cannot build up to an excessive degree which would permit pressure relief valve 20 to open and weep or vent water through drain tube 21 to the underlying ground or floor.

Referring next to FIG. 2, this figure illustrates the structure of pressure relief valve 10 in more detail. Relief valve 10 is shown disconnected from hose 12 and faucet 11 in expanded or exploded form in order to better illustrate the means for installing and coupling the relief valve 10 into the system.

The pressure relief valve 10 is provided with a T-type housing 22 which has a conventional rotatable female threaded coupling member 23 for threadable coupling onto the threaded male spout end 24 of faucet 11. A rubber of vinyl washer is also provided in the female coupling member 23 to provide a good seal.

The left side of the T housing 22 is provided with a male threaded coupling member 25 which receives the female threaded coupling member 26 of conventional washing machine inlet hose 12 thereby permitting free flow of the water supply from faucet 11 through housing 22 on to the washing machine.

The bottom leg 22 of T 22 is cut away to expose the pressure relief valve mechanism 28 therein. This pressure relief valve mechanism 28 is illustrated diagramtically as a check valve ball 29 pressed upwardly into engagement with annular valve seat 30 by means of spring 31 which is preselected to provide the appropriate pressure so that it will open only when the water pressure within T housing 22 exceeds the predetermined pressure of approximately 80 to 90 p.s.i. or less.

Water that vents downwardly through valve 28 is directed away through drain hose 32 which is coupled in a conventional manner to the threaded coupling 33.

It can thus be seen that it is very simple for the average mechanically unskilled homeowner to quickly turn off water faucet 11, disconnect washing machine inlet hose 12, connect pressure relief valve 10 to faucet 11 and then reconnect hose 12 to the opposite end of pressure relief valve 10 and then direct the flexible drain hose 32 of pressure relief valve 10 to either the washing machine drain 15 or a stationary laundry tub. This figure also illustrates how relatively inexpensive the pressure relief valve mechanism 10 of the present invention is to manufacture.

Returning again to FIG. 1, conventional water shut-off valve 34 may also be screwed directly onto threaded end 25 of pressure relief valve 10 and then threaded coupling 26 coupled onto the opposite side of shut-off valve 34 as an option to permit the homeowner to prevent water under pressure from entering into flexible inlet washing machine hose 12 yet still permit the water pressure relief valve 10 to function normally.

I claim:

1. A water pressure relief valve for use in association with a water heater tank comprising a water line connected to a water heater tank for supplying water to or from said tank, said water line also connected to a washing machine inlet supply faucet for supplying water to a washing machine through a flexible hose from said faucet and having a conventional threaded male coupling on an outlet spout end thereof for threadable coupling to a conventional hose or the like, and water pressure relief valve means coupled between said spout end and a washing machine inlet hose for passing water therethrough to said inlet hose and having a pressure relief valve therein for venting water therefrom through a pressure relief outlet when the water pressure therein exceeds a predetermined maximum, and a drain hose connected to said pressure relief outlet for directing vented water to a suitable drain.

2. The water pressure relief valve of claim 1 wherein said predetermined maximum pressure is in the approximate range of 80 to 90 p.s.i.

3. The water pressure relief valve of claim 1 wherein said water heater tank is provided with a pressure relief valve set to vent water from said tank when the pressure thereof exceeds a predetermined maximum which is greater than the aforesaid predetermined maximum pressure for said pressure relief valve in said water pressure relief valve means.

4. The water pressure relief valve of claim 3 wherein said water line is a cold water supply line.

5. The water pressure relief valve of claim 1 including an additional shut off valve connected between said water pressure relief valve means and said flexible hose.

6. A method of alleviating weepage from a first pressure relief valve commonly provided on fast recovery hot water heaters due to excessive water pressure buildup, comprising the steps of connecting a second pressure relief valve between a water outlet faucet and a water inlet hose for a washing machine, said water outlet faucet connected to a water line that is also connected to said tank, said second pressure relief valve being preset to vent water under excessive pressure at a predetermined maximum which is less than the predetermined maximum pressure set for said first pressure relief valve on the tank.

7. The method of claim 6 including the step of directing the water vented under pressure to an appropriate drain.

8. The method of claim 7 wherein the water vented under pressure is vented at a pressure range of approximately 80 to 90 p.s.i.

9. The method of claim 6 including the step of connecting a water shut off valve between said second pressure relief valve and said hose.

10. The method of claim 6 wherein said water outlet faucet is a cold water supply faucet.

11. The method of relieving pressure buildup in interior residential water lines comprising the steps of, connecting a water pressure relief valve between a washing machine water supply outlet faucet and a flexible washing machine water inlet hose and venting water therefrom under excessive pressure to an appropriate drain.

12. The method of claim 11 wherein the step of venting is carried out within an approximate water pressure range of 80 to 90 p.s.i.

13. The method of claim 11 including the step of connecting a water shut off valve between said pressure relief valve and said hose.

14. The method of claim 11 wherein said water pressure relief valve is connected to a cold water supply outlet faucet.

* * * * *